(12) United States Patent
Kitamura

(10) Patent No.: US 12,131,216 B2
(45) Date of Patent: *Oct. 29, 2024

(54) INFORMATION PROCESSING APPARATUS, INFORMATION PROCESSING METHOD, AND COMPUTER-READABLE STORAGE MEDIUM

(71) Applicant: CANON KABUSHIKI KAISHA, Tokyo (JP)

(72) Inventor: Toshifumi Kitamura, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,682

(22) Filed: Aug. 9, 2023

(65) Prior Publication Data
US 2023/0385570 A1    Nov. 30, 2023

Related U.S. Application Data
(63) Continuation of application No. 17/474,473, filed on Sep. 14, 2021, now Pat. No. 11,763,110.

(30) Foreign Application Priority Data
Sep. 18, 2020   (JP) ................................. 2020-157675

(51) Int. Cl.
*G06K 7/10*    (2006.01)
(52) U.S. Cl.
CPC ..... *G06K 7/10396* (2013.01); *G06K 7/10188* (2013.01); *G06K 7/10217* (2013.01)

(58) Field of Classification Search
None
See application file for complete search history.

(56) References Cited

U.S. PATENT DOCUMENTS 8,207,858 B2 *  6/2012  Knopf ..................... E04G 21/32
                                                340/5.1
8,410,906 B1 *  4/2013  Dacus ................ G06K 7/10039
                                                455/41.2
(Continued)

FOREIGN PATENT DOCUMENTS

AU     2017204011 A1     7/2017
CN      207251920 U      4/2018
(Continued)

OTHER PUBLICATIONS

Office Action issued in U.S. Appl. No. 17/474,473 mailed Dec. 30, 2022.
(Continued)

*Primary Examiner* — Fekadeselassie Girma
(74) *Attorney, Agent, or Firm* — ROSSI, KIMMS & McDOWELL LLP

(57) ABSTRACT

An information processing apparatus operable to specify identification information of a communication object that a moving object that carries a reader apparatus holds: receives, from the reader apparatus, identification information read from a communication object near the reader apparatus, and a reading time thereof; stores, in a memory unit, association information that includes association of the received identification information and the reading time; and specifies the identification information of the communication object that the moving object holds based on the association information stored in the memory unit.

22 Claims, 13 Drawing Sheets

(56) References Cited

U.S. PATENT DOCUMENTS

| | | | | |
|---|---|---|---|---|
| 8,674,810 B2* | 3/2014 | Uysal | ............... | G06K 7/0008 340/10.4 |
| 8,928,463 B2* | 1/2015 | Landau | ............. | G06K 7/10366 340/10.33 |
| 11,009,596 B2* | 5/2021 | Kamiya | .................. | G01S 13/32 |
| 2005/0164633 A1* | 7/2005 | Linjama | .................. | H04B 1/38 340/10.33 |
| 2007/0202807 A1* | 8/2007 | Kim | ...................... | H04W 12/50 340/572.1 |
| 2008/0088447 A1* | 4/2008 | Flores | ................. | G06Q 10/087 340/572.1 |
| 2012/0286936 A1* | 11/2012 | Mullen | ................. | G06Q 40/00 340/10.2 |
| 2013/0207795 A1* | 8/2013 | Gau | ........................ | B60R 16/02 340/426.11 |
| 2016/0241999 A1* | 8/2016 | Chin | ................. | G07C 9/00182 |
| 2019/0355197 A1* | 11/2019 | Mirpuri | .................. | H04W 4/80 |
| 2022/0070167 A1* | 3/2022 | Adams, Jr. | .............. | G06F 21/30 |
| 2023/0190134 A1* | 6/2023 | Shelton, IV | ............. | A61F 2/04 600/424 |
| 2023/0385570 A1* | 11/2023 | Kitamura | ........... | G06K 7/10188 |

FOREIGN PATENT DOCUMENTS

| | | |
|---|---|---|
| CN | 108038525 A | 5/2018 |
| CN | 210573920 U | 5/2020 |
| JP | 2012524948 A | 10/2012 |
| JP | 5987187 B1 | 9/2016 |
| KR | 1020170060250 A | 6/2017 |
| WO | 2010124107 A2 | 10/2010 |
| WO | 2018142594 A1 | 8/2018 |

OTHER PUBLICATIONS

Notice of Allowance issued in U.S. Appl. No. 17/474,473 mailed May 25, 2023.

* cited by examiner

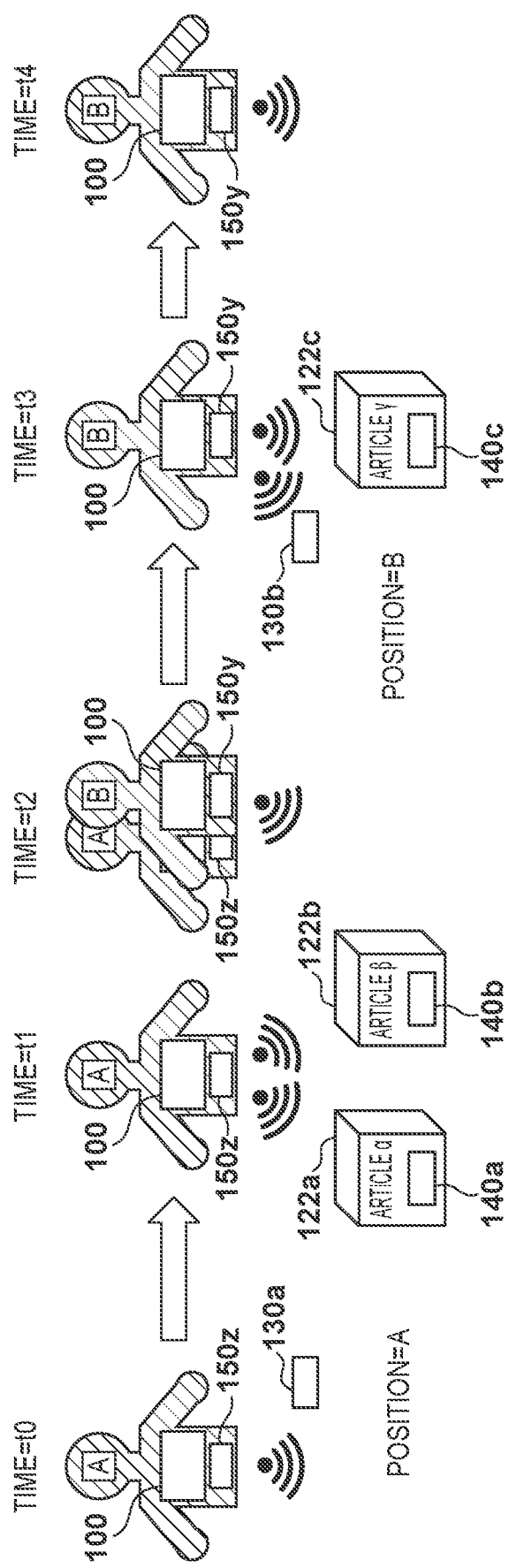

INFORMATION PROCESSING APPARATUS, INFORMATION PROCESSING METHOD, AND COMPUTER-READABLE STORAGE MEDIUM

BACKGROUND OF THE INVENTION

Field of the Invention

The present invention relates to an information processing apparatus that processes information of wireless tags read by a reader apparatus, an information processing method, and a computer-readable storage medium.

Description of the Related Art

UHF-band passive RFID tags are widely used in distribution traceability and article management. Passive RFID tags can communicate over a small distance, so an RFID reader located at one position cannot read RFID tags over a wide range. Japanese Patent Laid-Open No. 2012-524948 (hereinafter, referred to as Patent Literature 1) proposes a method for managing articles in which, by a user wearing a portable RFID reader and moving, the RFID reader is enabled to read RFID tags over a wide range.

Generally, in article management, both the information read from an RFID tag attached on an article by an RFID reader and the identification information (hereinafter, referred to as ID information) of a user that is using the RFID reader need to be recorded. However, in the method of Patent Literature 1, although a user can automatically read RFID tags attached to articles when carrying the articles, it is not considered to automatically specify the ID information of the user carrying the articles. Therefore, in order to obtain the ID information of the user carrying the RFID reader, a procedure such as prompting the user to set their ID information to the RFID reader, for example, is required. For this reason, there is a problem that effort is needed to set ID information or the like when a user uses an RFID reader, and that there is a possibility that a mistake in setting ID information or the like may occur.

SUMMARY OF THE INVENTION

The present invention provides a method of automatically specifying identification information of a moving object carrying a reader apparatus that reads wireless tags.

According to one aspect of the present invention, there is provided an information processing apparatus operable to specify identification information of a communication object that a moving object that carries a reader apparatus holds, the apparatus comprising: a receiving unit configured to receive, from the reader apparatus, identification information that the reader apparatus read from a communication object near the reader apparatus, and a reading time thereof; a storing unit configured to store, in a memory unit, association information that includes association of the identification information received by the receiving unit and the reading time; and a specifying unit configured to specify the identification information of the communication object that the moving object holds based on the association information stored in the memory unit.

According to another aspect of the present invention, there is provided an information processing method for specifying identification information of a communication object that a moving object that carries a reader apparatus holds, the method comprising: receiving, from the reader apparatus, identification information that the reader apparatus read from a communication object near the reader apparatus, and a reading time thereof; storing, in a memory unit, association information that includes association of the received identification information and the reading time; and specifying the identification information of the communication object that the moving object holds based on the association information stored in the memory unit.

According to another aspect of the present invention, there is provided a non-transitory computer-readable storage medium operable to store a program for causing a computer to execute an information processing method of specifying identification information of a communication object that a moving object that carries a reader apparatus holds, the method comprising: receiving, from the reader apparatus, identification information that the reader apparatus read from a communication object near the reader apparatus, and a reading time thereof; storing, in a memory unit, association information that includes association of the received identification information and the reading time; and specifying the identification information of the communication object that the moving object holds based on the association information stored in the memory unit.

Further features of the present invention will become apparent from the following description of exemplary embodiments with reference to the attached drawings.

BRIEF DESCRIPTION OF THE DRAWINGS

FIG. 14 is a view illustrating an example of operation of an RFID reader according to the fourth embodiment.

DESCRIPTION OF THE EMBODIMENTS

Figure 1:
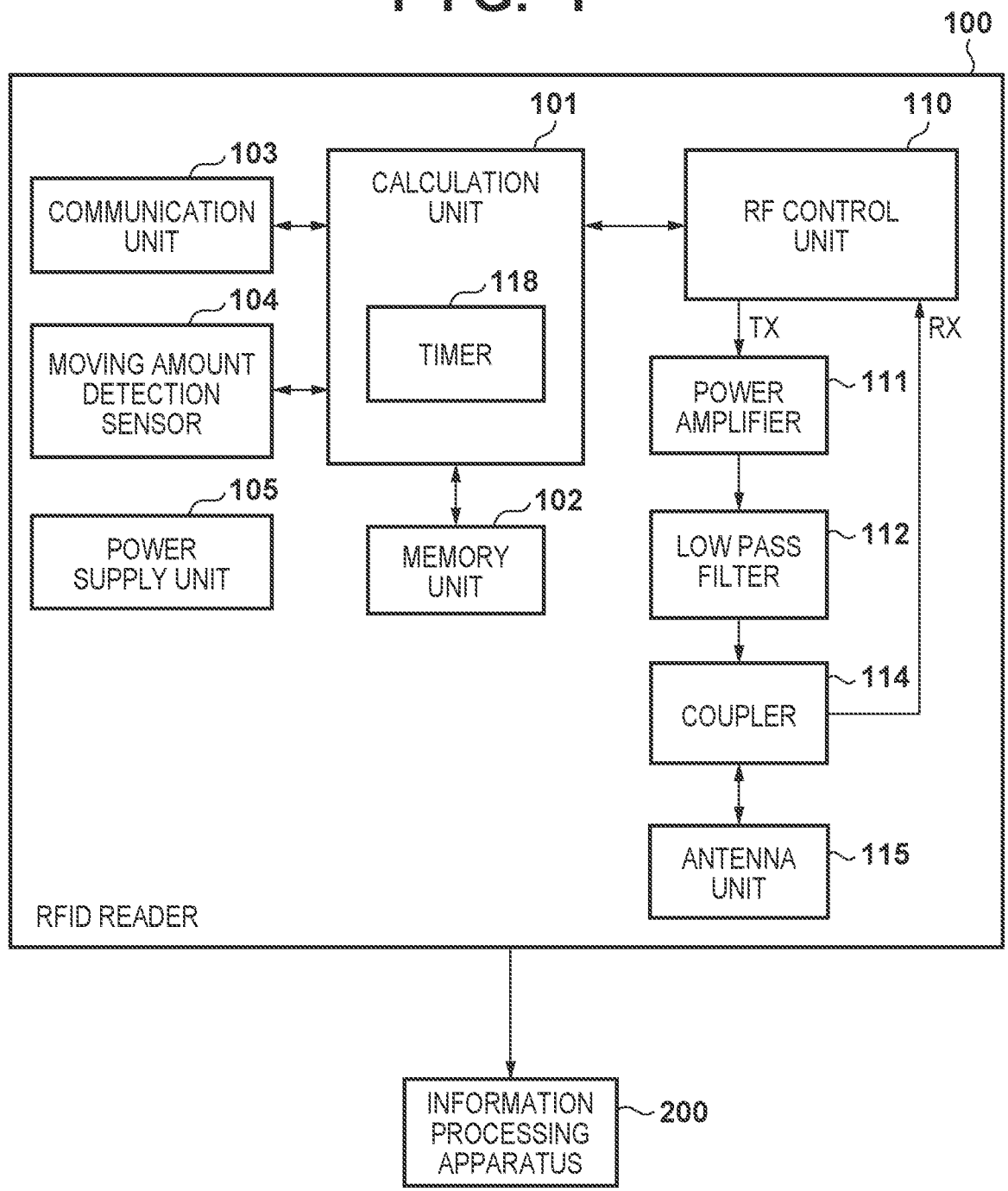
FIG. 1 is a block diagram illustrating an example of a hardware configuration of an RFID reader of a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

A method of specifying the identification information of a moving object carrying a reader apparatus based on a reading result from the reader apparatus (RFID reader) that reads ID information embedded in wireless tags (RFID tags) is described below.

FIG. 1 is a block diagram illustrating an example of a configuration of an RFID reader 100 according to a first embodiment. The RFID reader 100 may constitute, for example, a position detection system for managing the positions of articles to which RFID tags are attached together with an information processing apparatus 200, which is connected to be capable of communication. The RFID reader 100 wirelessly reads information from RFID tags, which are external communication objects. For example, the RFID reader 100, by supplying an electromagnetic wave in an UHF-band to an RFID tag, operates an IC chip in the RFID tag and reads out identification information (hereinafter, ID information) stored in a memory unit of the RFID tag. The RFID reader 100, by being transported by a moving object, reads ID information from RFID tags attached on articles that are present over a wide range and notifies the information processing apparatus 200 of a result thereof. The information processing apparatus 200 manages the positions of the respective articles based on information from the RFID reader 100. Also, the information processing apparatus 200 of the present embodiment automatically specifies the ID information of a moving object carrying the RFID reader 100 based on the ID information collected from the RFID reader 100.

FIG. 1 also illustrates an example of a hardware configuration of the RFID reader 100. In the RFID reader 100, a calculation unit 101 includes one or more processors (hereinafter, processor). The processor of the calculation unit 101, by executing programs stored in one or more memories (for example, a memory unit 102), realizes various kinds of control of the RFID reader 100.

An RF control unit 110, under the control of the calculation unit 101, performs RF output in a UHF band from a TX terminal. The power of the RF output can be set to be variable by the calculation unit 101. RF output signals outputted from the TX terminal are supplied to an antenna unit 115 via a power amplifier 111, a Low-pass filter 112, and a coupler 114. The power amplifier 111 amplifies the RF output signals. The Low-pass filter 112 cuts unwanted frequency bands of amplified RF output signals. The coupler 114 branches the RF output signals that are to the antenna unit 115 and the RF input signals that are received by the antenna unit 115. The antenna unit 115 supplies power to RFID tags and is used for communication with RFID tags.

On the other hand, the RF input signals from RFID tags received by the antenna unit 115 are supplied to an RX terminal of the RF control unit 110 via the coupler 114. The RF control unit 110 receives the RF input signals inputted from the RX terminal, detects the ID information of RFID tags, and outputs the detected ID information to the calculation unit 101. The RF control unit 110 to the antenna unit 115 provide a configuration for reading the ID information of external communication objects via wireless communication with the communication objects.

The calculation unit 101 stores the ID information of RFID tags detected by the RF control unit 110 in the memory unit 102, and performs required data processes. A communication unit 103 transmits the processed data to the information processing apparatus 200, which is an external apparatus. It is preferable that the communication unit 103 performs wireless communication, and the communication unit 103 performs communication with an external apparatus by, for example, Bluetooth, Wi-Fi, or the like. Note that the calculation unit 101 internally includes a timer 118, and can include the times (the values of the timer 118) at which the ID information of RFID tags were detected in the data to be transmitted to the external device. That is, the calculation unit 101 obtains, by the timer 118, the times at which the ID information has been read by the RF control unit 110.

A moving amount detection sensor 104 includes a three-axis acceleration sensor, a gyro sensor, a geomagnetic sensor, and detects the moving amount of the RFID reader 100. The calculation unit 101 can obtain a relative position between a position RFID tag (hereinafter, referred to as position tag) indicating a position to be a reference and an article RFID tag (hereinafter, referred to as article tag) attached on an article from the output of the moving amount detection sensor 104. A power supply unit 105 includes a battery, a DCDC converter, and the like, and supplies power to the respective units of the RFID reader 100.

Figure 2A:
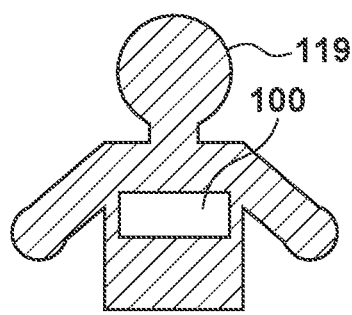
FIGS. 2A, 2B, and 2C are views illustrating examples of moving objects to which an RFID reader of the first embodiment is mounted and transported.
Figure 2B:
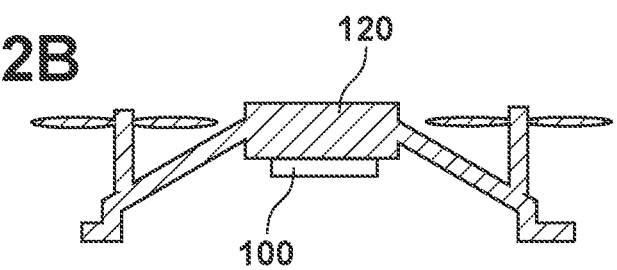
Figure 2C:
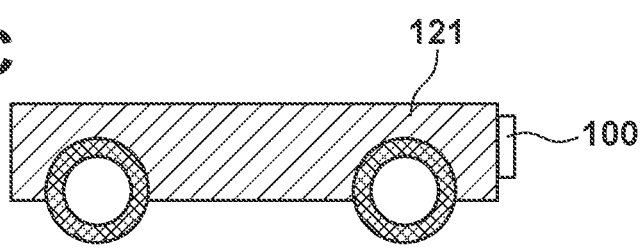

FIGS. 2A to 2C illustrate examples of moving objects to which the above-described RFID reader 100 can be mounted. FIG. 2A illustrates an example in which the RFID reader 100 is worn by a person (a user 119). FIG. 2B illustrates an example in which the RFID reader 100 is mounted to a drone 120. FIG. 2C illustrates an example in which the RFID reader 100 is mounted to an automatic guided vehicle 121. By mounting the RFID reader to a moving object, the RFID reader 100 can be moved over a wide range. This allows the RFID reader 100 to compensate for the shortness of communication distance, which is a weakness of RFID tags. Thus, according to the present embodiment, it is possible to detect article tags that are attached to targets of management over a wide range by causing a moving object such as a person, an animal, or a machine to carry the RFID reader 100. Although not illustrated in FIGS. 2A to 2C, an RFID tag (hereinafter, a moving object tag) is also attached to a moving object, and the RFID reader 100 and the moving object tag move together with the moving object.

Figure 3:
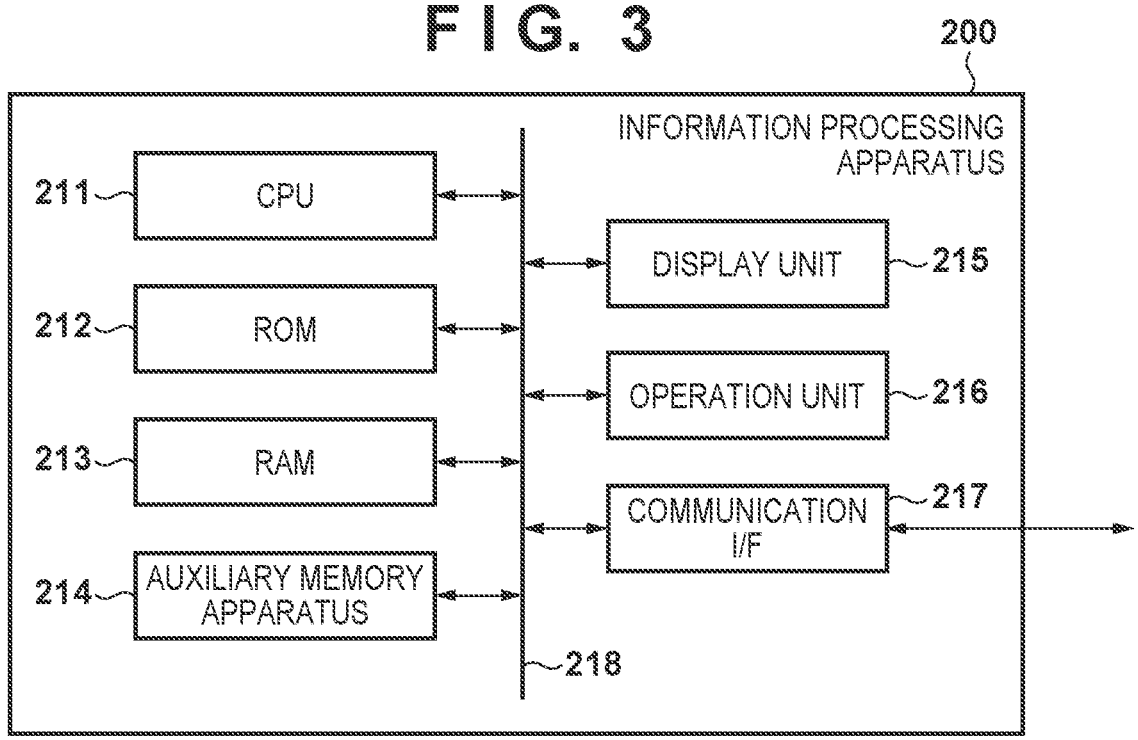
FIG. 3 is a block diagram illustrating an example of a hardware configuration of an information processing apparatus of the first embodiment.

FIG. 3 is a block diagram illustrating an example of a hardware configuration of the information processing apparatus 200. As the information processing apparatus 200, a smartphone, a personal computer (PC), or the like, for example, can be used. The information processing apparatus 200 includes a CPU 211, a ROM 212, a RAM 213, an auxiliary memory apparatus 214, a display unit 215, an operation unit 216, a communication I/F 217, and a bus 218.

The CPU 211 realizes the respective functions of the information processing apparatus 200 to be described later by controlling the entire information processing apparatus 200 using computer programs and data stored in the ROM 212 or the RAM 213. Note that configuration may be taken such that the information processing apparatus 200 has one or more dedicated hardware different from the CPU 211, and the dedicated hardware executes at least some of the processes by the CPU 211. As examples of dedicated hardware, there are an ASIC (application specific integrated circuit), an FPGA (field-programmable gate array), a DSP (digital signal processor), and the like. The ROM 212 stores programs that do not need to be changed and the like. The RAM 213 temporarily stores programs and data supplied from the auxiliary memory apparatus 214, data supplied from external units via the communication I/F 217, and the like. The auxiliary memory apparatus 214 is configured by, for example, a hard disk drive or the like and stores various kinds of data such as image data and voice data.

The display unit 215 includes, for example, a liquid crystal display, LEDs, and the like, and displays a GUI (Graphical User Interface) and the like for the user to operate the information processing apparatus 200. The operation unit 216 includes, for example, a keyboard, a mouse, a joystick, a touch panel, and the like, and inputs various instructions to the CPU 211 in response to an operation by the user. The communication I/F 217 is used for communication with external apparatuses (the RFID reader 100 in the present embodiment) of the information processing apparatus 200. The bus 218 connects the respective units of the information processing apparatus 200 and transmits information.

Figure 4:
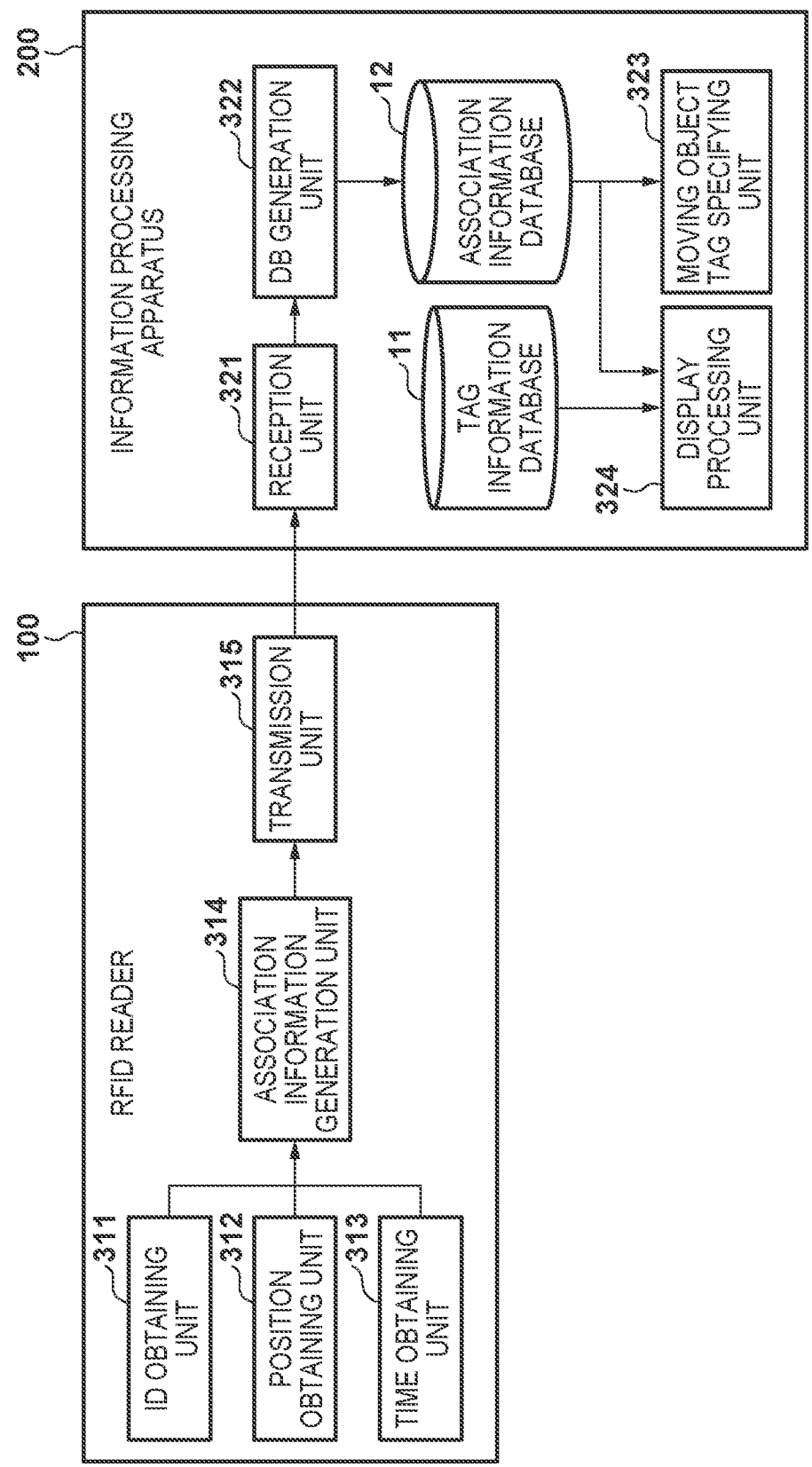
FIG. 4 is a block diagram illustrating an example of a functional configuration of a position detection system of the first embodiment.

FIG. 4 is a block diagram illustrating an example of a functional configuration of the RFID reader 100 and the information processing apparatus 200 that constitute the position detection system. In the RFID reader 100, an ID obtaining unit 311 reads ID information from RFID tags. More specifically, the ID obtaining unit 311 detects the ID information of RFID tags from RF input signals inputted via the antenna unit 115 and stores the detected ID information in the memory unit 102. A position obtaining unit 312 obtains position information indicating a relative position of an article tag or a moving object tag with respect to a position tag based on the moving amount of the RFID reader 100 detected by the moving amount detection sensor 104. A time obtaining unit 313 obtains time information indicating the time (also referred to as detection time) at which the ID obtaining unit 311 obtained the ID information of an article tag or a moving object tag with reference to the timer 118. An association information generation unit 314 generates association information in which the ID information obtained by the ID obtaining unit 311, the position information obtained by the position obtaining unit 312, and the time information obtained by the time obtaining unit 313 are associated with one article tag or moving object tag. A transmission unit 315 transmits the association information that the association information generation unit 314 generated to the information processing apparatus 200 using the communication unit 103.

In the information processing apparatus 200, a reception unit 321 receives the association information from the RFID reader 100 via the communication I/F 217. A DB generation unit 322 stores the received association information in a memory (the ROM 212, the RAM 213 or the auxiliary memory apparatus 214) and generates an association information database 12 (which will be described later with reference to FIG. 5). A moving object tag specifying unit 323 specifies the tag of a moving object carrying the RFID reader 100 from the ID information of recorded RFID tags by referring to the association information database 12. The process of the moving object tag specifying unit 323 will be described later with reference to the flowchart of FIG. 9. A display processing unit 324 displays a detection result of the positions of articles by referring to a tag information database 11 and the association information database 12. The display of the detection result of the positions of articles by the display processing unit 324 will be described later with reference to FIG. 8.

As described above, the RFID reader 100, while automatically detecting ID information of RFID tags (a position tag, an article tag, and a moving object tag), obtains position information representing a relative position of an article tag/moving object tag with respect to a position tag, and time information representing the time of reading thereof. Then, the association information generation unit 314 of the RFID reader 100 generates association information in which the ID information of RFID tags, the time information, and the position information are associated, and transmits it to the information processing apparatus 200. In the information processing apparatus 200, the DB generation unit 322 generates the association information database 12 from the received association information, and the moving object tag specifying unit 323 specifies the identification information of a moving object tag based on the association information recorded in the association information database 12.

Figure 5:
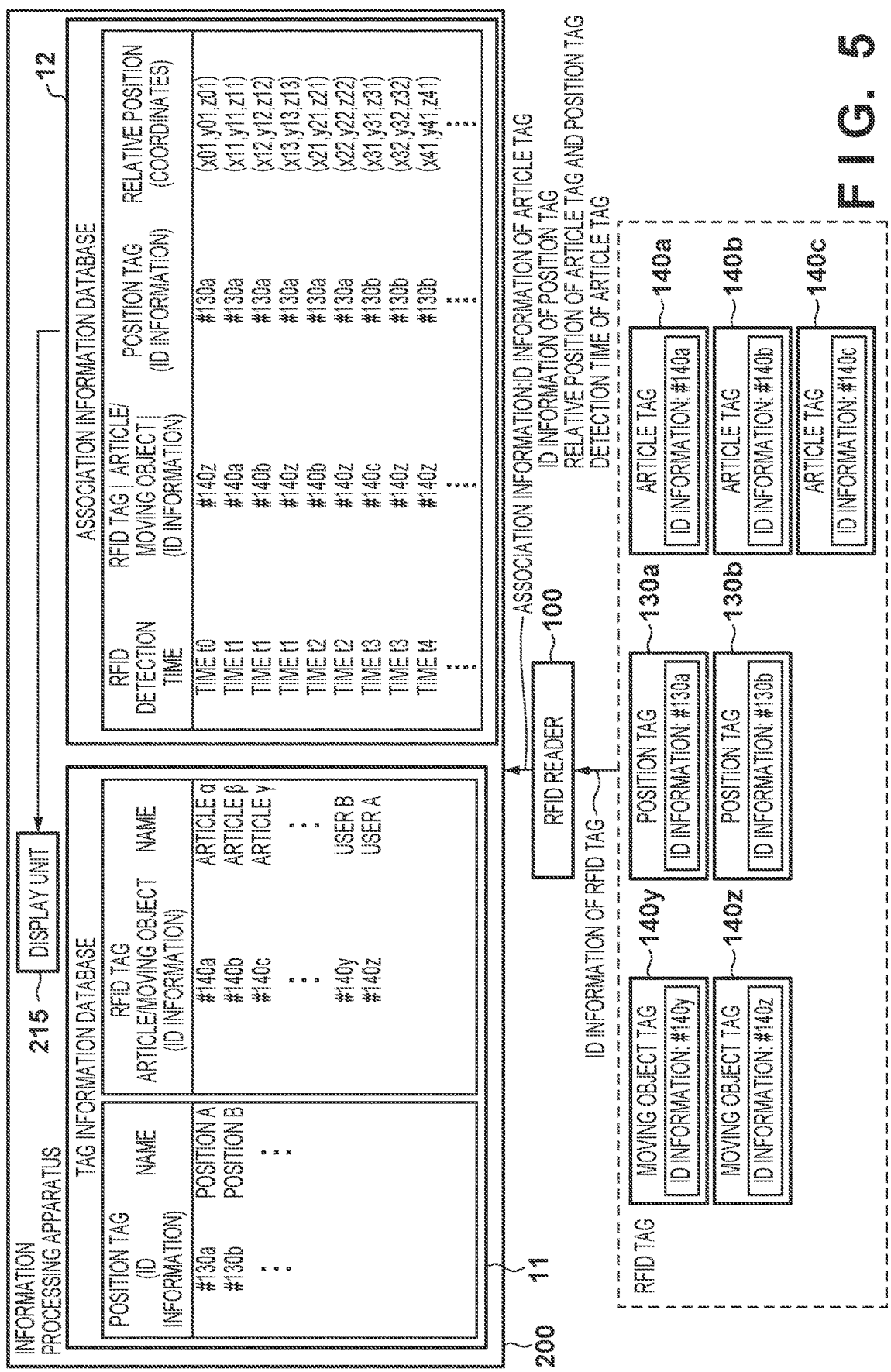
FIG. 5 is a view illustrating an example of a data configuration of association information and databases according to the first embodiment.
Figure 6:
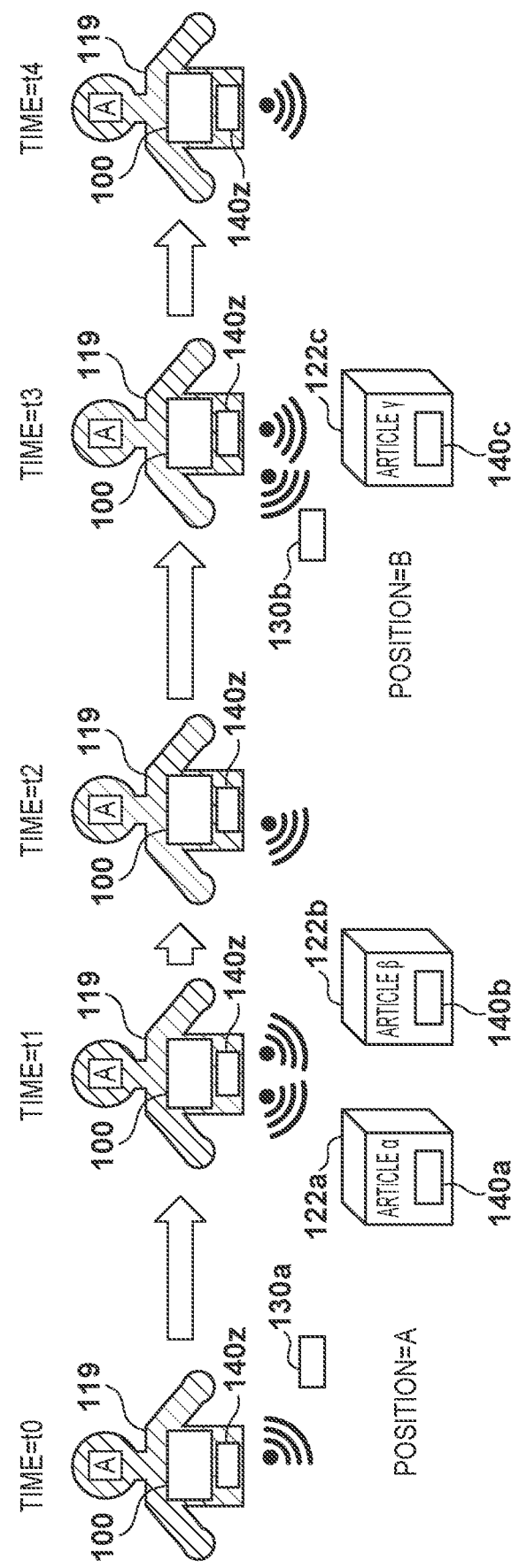
FIG. 6 is a view illustrating an example of operation of the RFID reader according to the first embodiment.

FIG. 5 is a view illustrating an example of a data configuration of association information and databases of the position detection system in the first embodiment. FIG. 6 is a view illustrating an example of operation (an example of the detection state of RFID tags) of the RFID reader 100 in the first embodiment. Hereinafter, as illustrated in FIG. 6, the position detection system of the first embodiment will be described assuming a situation in which the user 119 wearing the RFID reader 100 passes near articles 122. As for the RFID tags, there are position tags 130a to 130b, article tags 140a to 140c, and moving object tags 140y to 140z. Hereinafter, when the position tags 130a to 130b are collectively referred to, they are referred to as position tags 130. The position tags 130 are RFID tags arranged for the detection of a reference position, and are attached to a floor or the like, for example, and the arrangement positions thereof are fixed. The article tags 140a to 140c are RFID tags attached to articles 122 (122a to 122c), which are targets of management. The moving object tag 140z is an RFID tag attached to a moving object (the user 119 in this example). The RFID reader 100 and the information processing apparatus 200 of the first embodiment distinguish between the position tags 130 and other tags (the article tags 140a to 140c and the moving object tags 140y to 140z), but do not distinguish between the article tags and the moving object tags. Therefore, hereinafter, the article tags 140a to 140c and the moving object tags 140y to 140z are collectively referred to as article tags 140.

In the example of FIG. 6, the RFID reader 100 reads the ID information of the position tag 130a and the ID information of the moving object tag 140z of the user A at time t0. At time t1, the RFID reader 100 reads the ID information of the article tags 140a and 140b attached to the articles 122a and 122b, and the moving object tag 140z. At time t2, the RFID reader 100 reads the ID information of the article tag 140b and the moving object tag 140z. At time t3, the RFID reader 100 reads the ID information of the position tag 130b, the article tag 140c of the article 122c, and the moving object tag 140z, and, at time t4, reads the ID information of the moving object tag 140z.

As illustrated in FIG. 5, in the tag information database 11, data in which the ID information of the position tags 130 and position names are associated and data in which the ID information of the article tags 140 and the names of the articles 122 or moving objects (the users 119) are associated are registered. Note that in FIG. 5, for convenience, the ID information that the respective RFID tags include is illustrated by adding # to the beginning of the reference numbers assigned to the RFID tags. The RFID reader 100 transmits association information in which the ID information read from the article tags 140, the ID information read from the position tags 130, the position information indicating relative positions between the article tags 140 and the position tags 130, and detection times (time information) of RFID are associated.

The RFID reader 100 can simultaneously read a plurality of RFID tags and periodically repeats the read operation of RFID tags. The RFID reader 100 transmits, to the information processing apparatus 200, "association information" in which the ID information of the article tags 140, the ID information of the position tags 130, the position information (coordinate) indicating relative positions between the article tags 140 and the position tags 130, and the detection times of the article tags 140 are associated.

Note that it is assumed that the RFID reader 100 can distinguish between the position tags 130 and other tags (article tags 140) on its own. Various methods are conceivable as methods of determining whether or not an RFID tag is a position tag 130. For example, the numerical range of the ID information of the position tags is predetermined, and determination can be made by whether or not the obtained ID information is within the numerical range. Alternatively, the RFID reader 100 may notify the information processing apparatus 200 of the read ID information and inquire whether or not the ID information is a position tag. Further, the RFID reader 100 generates association information and transmits it to the information processing apparatus 200 when a change occurs in the combination of the article tags read simultaneously in a result of periodically executed readings of RFID tags. For example, at time t1, by the RFID tags of the article 122a and the article 122b being read in addition to the moving object tag 140z, association information is transmitted to the information processing apparatus 200. At time t4, by the article tag 140c of the article 122c not being able to be read, association information is transmitted to the information processing apparatus 200. Incidentally, association information may be transmitted for each periodically performed reading of RFID tags, but the communication frequency will increase.

The information processing apparatus 200 (DB generation unit 322) generates the association information database 12 by storing the association information received from the RFID reader 100 as a single record. Accordingly, the ID information of the position tags 130, the ID information of the article tags 140, the relative positions of the position tags 130 and the article tags 140, and the detection times (t0, t1, t2, . . . ) of the article tags 140 are stored in the association information database 12 in association with each other. Further, the display unit 215 can display the position information of the articles stored in the association information database 12 by the user's operation.

Figure 7:
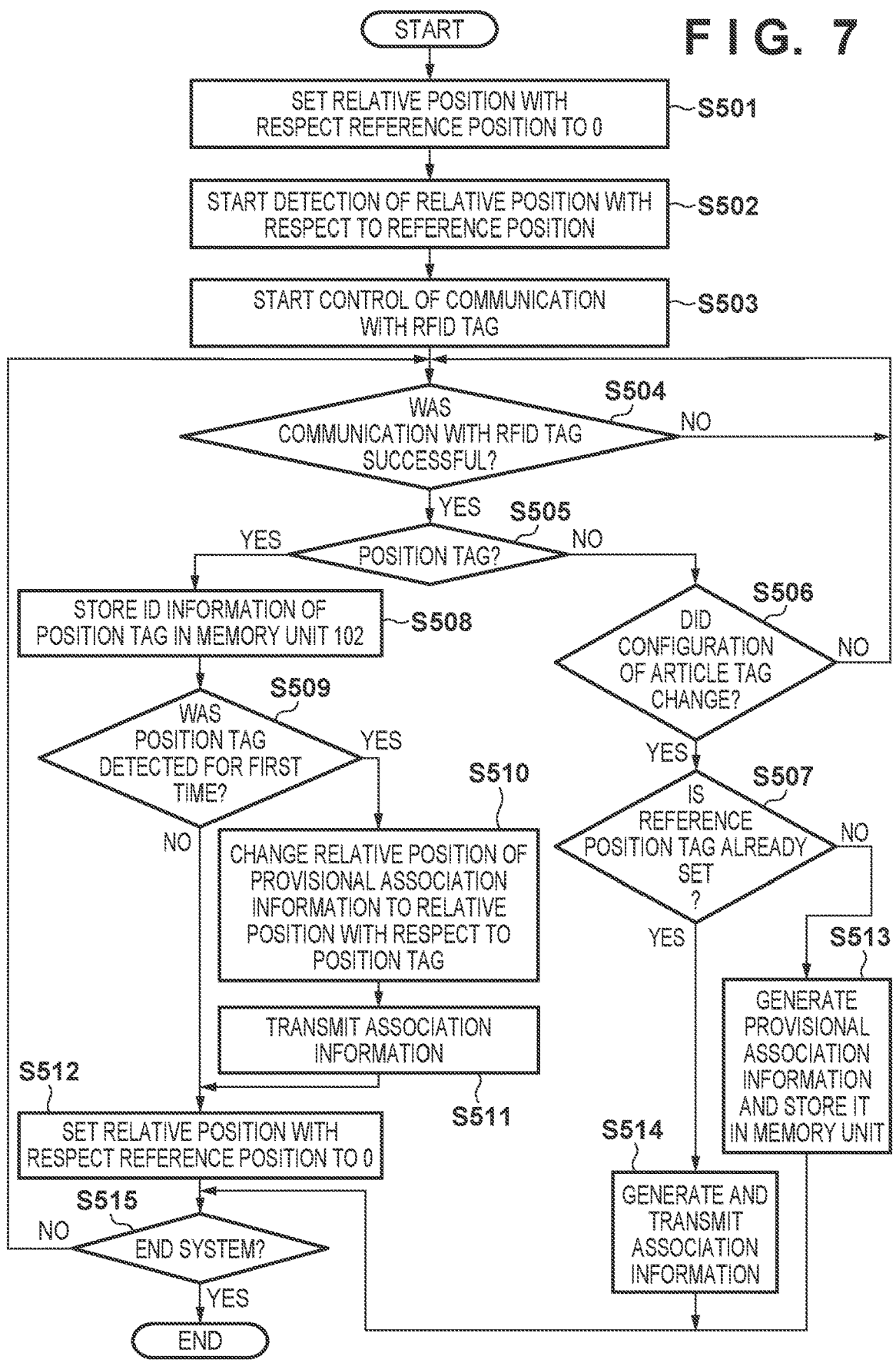
FIG. 7 is a flowchart explaining a process of generating the association information in the first embodiment.

Next, the operation of the RFID reader 100 and the information processing apparatus 200 according to the first embodiment will be described in detail. FIG. 7 is a flowchart illustrating a process of generating association information by the RFID reader 100 of the first embodiment. When power is in an ON state, the RFID reader 100 periodically reads out the ID information from RFID tags and executes the process of detecting the position information of articles and generating association information.

In step S501, the position obtaining unit 312 sets the information of a relative position with respect to a reference position in the memory unit 102 to 0 (x=0, y=0, z=0) in order to set the position at the time of activation of the RFID reader 100 as the reference position. In step S502, the position obtaining unit 312 starts a process of updating the information of the relative position with respect to the reference position in the memory unit 102 using an integrated value of a moving amount, which is a detection result of the moving amount detection sensor 104. In step S503, the ID obtaining unit 311 starts control for periodically operating the RF control unit 110 and performing communication with RFID tags.

In step S504, the association information generation unit 314 determines whether communication with an RFID tag has been successful and the ID obtaining unit 311 has been able to obtain the ID information of the RFID tag. When the ID information of the RFID tag could be obtained, the process proceeds to step S505, and when the ID information of the RFID tag could not be obtained, the process of step S504 is repeated. In step S505, the association information generation unit 314 determines whether the RFID tag is a position tag 130 or another RFID tag (article tag 140) based on the ID information obtained by the ID obtaining unit 311. In step S505, when it is determined that it is an RFID tag other than a position tag (NO in step S505), the process proceeds to step S506, and when it is determined that it is a position tag (YES in step S505), the process proceeds to step S508.

If the RFID tag is other than a position tag, in this embodiment, the RFID tag is an article tag 140 (article tags 140a to 140c or moving object tags 140y to 140z, hereinafter, also referred to as an article/moving object tag). In step S506, the association information generation unit 314 determines whether or not the configuration of article tags 140 detected at the same time has changed (such as a new article tag has been detected or an article tag that was being detected is no longer detected). If there is no change in the configuration of the detected article tags, the process returns to step S504 and no association information is generated. On the other hand, if there is a change in the configuration of the article tags detected at the same time, the process proceeds to step S507. In step S507, the association information generation unit 314 determines whether or not a position tag of reference has already been set. If the position tag to be a reference has not yet been able to be set, such as immediately after the activation of the RFID reader 100, the process proceeds to step S513, and if the position tag to be a reference has already been set, the process proceeds to step S514. In step S513, the association information generation unit 314 stores the information in which the "ID information of the article tag 140", the "detection time of the article tag 140", and the "relative position between the reference position (initial position at the time of activation) and the article tag 140" are associated as provisional association information in the memory unit 102.

On the other hand, if it is determined in step S505 that the communicated RFID tag is a position tag (YES in step S505), the process proceeds to step S508. In step S508, the association information generation unit 314 stores the ID information of the position tag 130 and the information of the relative position with respect to the reference position obtained by the ID obtaining unit 311 in the memory unit 102 as the information of the position tag of reference. In step S509, the association information generation unit 314 determines whether or not the current detection of a position tag is the first detection of a position tag after the activation of the RFID reader 100. If it is determined that it is the first detection of a position tag, the process proceeds to step S510, and otherwise (if it is the second and subsequent detection of a position tag), the process proceeds to step S512.

The process in steps S510 to S511 is a process that is executed only once when a position tag is detected for the first time after the activation of the RFID reader 100, and is a process of updating the provisional association information stored in the memory unit 102 in step S513 to the association information transmitted to the information processing apparatus 200. Therefore, if a plurality of pieces of provisional association information are stored in the memory unit 102, the process in steps S510 to S511 is executed on all of them. Also, if provisional association information is not stored in the memory unit 102, steps S510 to S511 are skipped.

In step S510, the association information generation unit 314 generates association information, which is a target of transmission to the information processing apparatus 200, from the provisional association information of the article/moving object tag stored in the memory unit 102 in step S513. Specifically, the position information of the article/moving object tag in the provisional association information (the position based on the position of the RFID reader 100 at the time of activation) is changed to the position information based on the position tag. First, the association information generation unit 314 obtains "information of the relative position of the article tag 140 with respect to the reference position (the initial position at the time of activation)" of the provisional association information stored in the memory unit 102 in step S513. The association information generation unit 314 calculates the relative position between the position tag 130 and the article/moving object tag based on the relative position obtained from the provisional association information and the relative position from the reference position (the initial position at the time of activation) of the RFID reader 100 at the time of detection of the position tag 130. The calculated relative position is the relative position of the article/moving object tag with respect to the position tag 130.

Next, in step S511, the association information generation unit 314 generates the association information by associating: the ID information of the article/moving object tag and the detection time included in the provisional association information; the ID information of the position tag 130; and the information of the relative position of the article/moving object tag with respect to the position tag 130. The association information generation unit 314 transmits the generated association information to the information processing apparatus 200 via the transmission unit 315. As for the communication of information between the transmission unit 315 and the reception unit 321, a communication unit such as Bluetooth, for example, can be used as described above.

In step S512, the association information generation unit 314 sets the information of the relative position of the memory unit 102 with respect to the reference position to 0 (x=0, y=0, z=0). By the information of the relative position being set to 0, the information of the relative position with respect to the reference position in the memory unit 102 indicates the relative position of the RFID reader 100 based on the last detected position tag. Thereafter, the process proceeds to step S515.

As described above, the position tag of reference is set by setting the relative position with respect to the reference position to 0 in step S512. Therefore, after the process in step S512 is executed even once, it is determined in the determination of step S507 that the position tag of reference has already been set. If it is determined in step S507 that the position tag of reference has already been set (YES in step S507), the process proceeds to step S514. In step S514, the association information generation unit 314 generates association information and transmits the generated association information to the information processing apparatus 200 via the transmission unit 315. The association information is information in which the ID information of the article/moving object tag, the ID information of the position tag 130 of reference (the position tag that was last detected at that time), the detection time of the article/moving object tag, and the information of the relative position between the article/moving object tag and the position tag 130 are associated. Note that the ID information of the article/moving object tag is obtained by the ID obtaining unit 311. The ID information of the position tag 130 is stored in step S508. The detection time of the article/moving object tag is obtained by the time obtaining unit 313. The information of the relative position between the article/moving object tag and the position tag 130 is obtained by the position obtaining unit 312.

The association information generation unit 314 repeats the above process in steps S504 to S514 until it is determined in step S515 that there has been a request to end the system. In this way, the calculation unit 101 of the RFID reader 100 automatically detects the positional information of the article tags 140 attached to the targets of management, and transmits the above-described association information to the information processing apparatus 200. Note that if a plurality of RFID tags are detected at the same time, the process in steps S505 to S514 will be performed for all of the RFID tags. At this time, if a position tag is included in the RFID tags detected at the same time, the execution of the process for the position tag takes precedence. This is to obtain position information based on the latest position tag.

Figure 8:
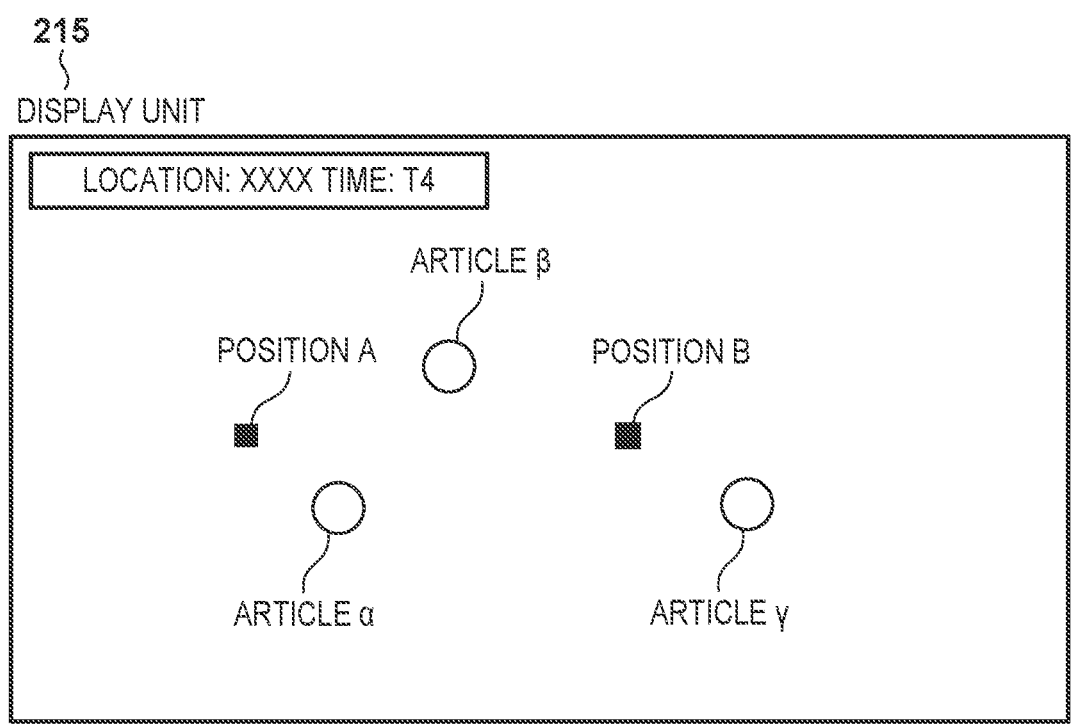
FIG. 8 is a view illustrating an example of a display by the information processing apparatus of the first embodiment.

As described above, the association information transmitted from the RFID reader 100 is registered in the association information database 12 of the information processing apparatus 200. The information processing apparatus 200, by distinguishing articles from a moving object carrying the RFID reader 100 from the content of the association information database 12, can, for example, indicate to the user the arrangement of articles at a certain time and location. For example, FIG. 8 illustrates an example of a display of the display unit 215 when the user has instructed the information processing apparatus 200 to display the article information of the location XXXX at time t4.

It is assumed that there are the position tag 130a arranged at a position A and the position tag 130b arranged at a position B in the region of the location XXXX. The display processing unit 324 refers to the association information database 12, and selects for each article tag, from the association information including the position tag 130a or the position tag 130b, the association information in which the detection time is closest to time t4. The display processing unit 324 refers to the information of the relative position between the article tag 140 and the position tag 130 of the selected association information, and displays, on the display unit 215, information representing the position of the articles 122 (article a, article 3, article y) based on the positions A and B. Note that the relationship between the article tags 140 and the articles 122 (names) can be obtained by referring to the tag information database 11. The user can grasp the position of each article based on the position of the position tag from the display content of the display unit 215. Note that by storing the relative positional relationship between the position tag 130*a* and the position tag 130*b* in advance, map information including a plurality of position tags 130 and articles can be displayed as illustrated in FIG. 8.

The display of article information as described above must not include information of moving object tags, and it must be determined whether or not the article tags 140 in the association information database 12 are moving object tags. In the information processing apparatus 200, the moving object tag specifying unit 323 specifies the ID information of a moving object based on the association information database 12. The process in which the moving object tag specifying unit 323 specifies the ID information of a moving object carrying the RFID reader 100 from the association information database 12 will be described below. Note that in this embodiment, an example in which the RFID reader 100 and the moving object tag 140*z* are worn by the user 119, and the position tags 130*a* to 130*b* and the article tags 140*a* to 140*c* are detected when the user 119 moves will be described. Note that in the following description, a method of specifying the moving object tag 140*z* from RFID tags detected by the RFID reader 100 will be described with a focus on the method, and therefore the description of the position tags 130 described above will be omitted. That is, the configuration related to the position information can be omitted for the process of specifying the ID information of the moving object.

As illustrated in FIG. 5, the association information database 12 stores association information in which each time and the obtained ID information are associated. In FIG. 5, the results of the article tags 140*a* to 140*c* and the moving object tag 140*z* detected at the respective times, time t0 to t4, are illustrated. It can be seen that in the period from time t0 to t4, the tag with the largest number of detections is the moving object tag 140*z*. This is because the frequency at which the moving object tag 140*z* can be detected by the RFID reader 100 is increased due to the user 119 carrying both the RFID reader 100 and the moving object tag 140*z*. Thus, the RFID tag corresponding to the ID information with the largest number of detections in a predetermined period can be specified as the moving object tag worn by the user 119 (moving object) that is wearing the RFID reader 100.

Hereinafter, the process of specifying the moving object tag according to the first embodiment will be described with reference to the flowchart of FIG. 9.

In step S701, the moving object tag specifying unit 323 sets a period for specifying a moving object tag, (hereinafter referred to as specific period). For example, the user may be able to set the start and end times of a specific period via the operation unit 216. Alternatively, when the user specifies the start time of a specific period, the end time of the specific period may be automatically set by adding a period of a predetermined length to the specified start time. Alternatively, the time when the RFID reader 100 starts the operation of reading RFID tags at a predetermined interval may be set as a start time, and a specific period may be set with the time, which is the start time to which a period of a predetermined length has been added, as an end time. Here, it is assumed that the times Ta to Tb have been set as the specific period. In step S702, the moving object tag specifying unit 323 refers to the association information database 12 and aggregates the number of detections for each piece of ID information of article tags from the association information in which the time within the specific period set in step S701 is associated.

In step S703, the moving object tag specifying unit 323 determines whether or not aggregate data is obtained from the association information of the specific period. If the aggregated data is not obtained (NO in step S703), the process proceeds to step S706, and if the aggregated data is obtained (YES in step S703), the process proceeds to step S704. In step S704, the moving object tag specifying unit 323 extracts the article tag corresponding to the ID information having the largest number of detections among the aggregated number of detections. In step S705, the moving object tag specifying unit 323 determines whether or not the number of article tags extracted in step S704 is one. If it is determined that it is not one, the process proceeds to step S706.

When the aggregate data is not obtained in step S702, or when there are a plurality of RFID tags extracted in step S704, the moving object tag specifying unit 323, in step S706, changes the specific period to be longer. For example, the moving object tag specifying unit 323 extends the specific period by delaying the time Tb by a while keeping the time Ta as is. Thereafter, the process proceeds to step S702 and the process from steps S702 to S705 is repeated. If it is determined in step S705 that the number of article tags extracted in step S704 is one (YES in step S705), the process proceeds to step S707. In step S707, the moving object tag specifying unit 323 specifies the extracted article tag as the moving object tag, and ends the present process.

Figure 9:
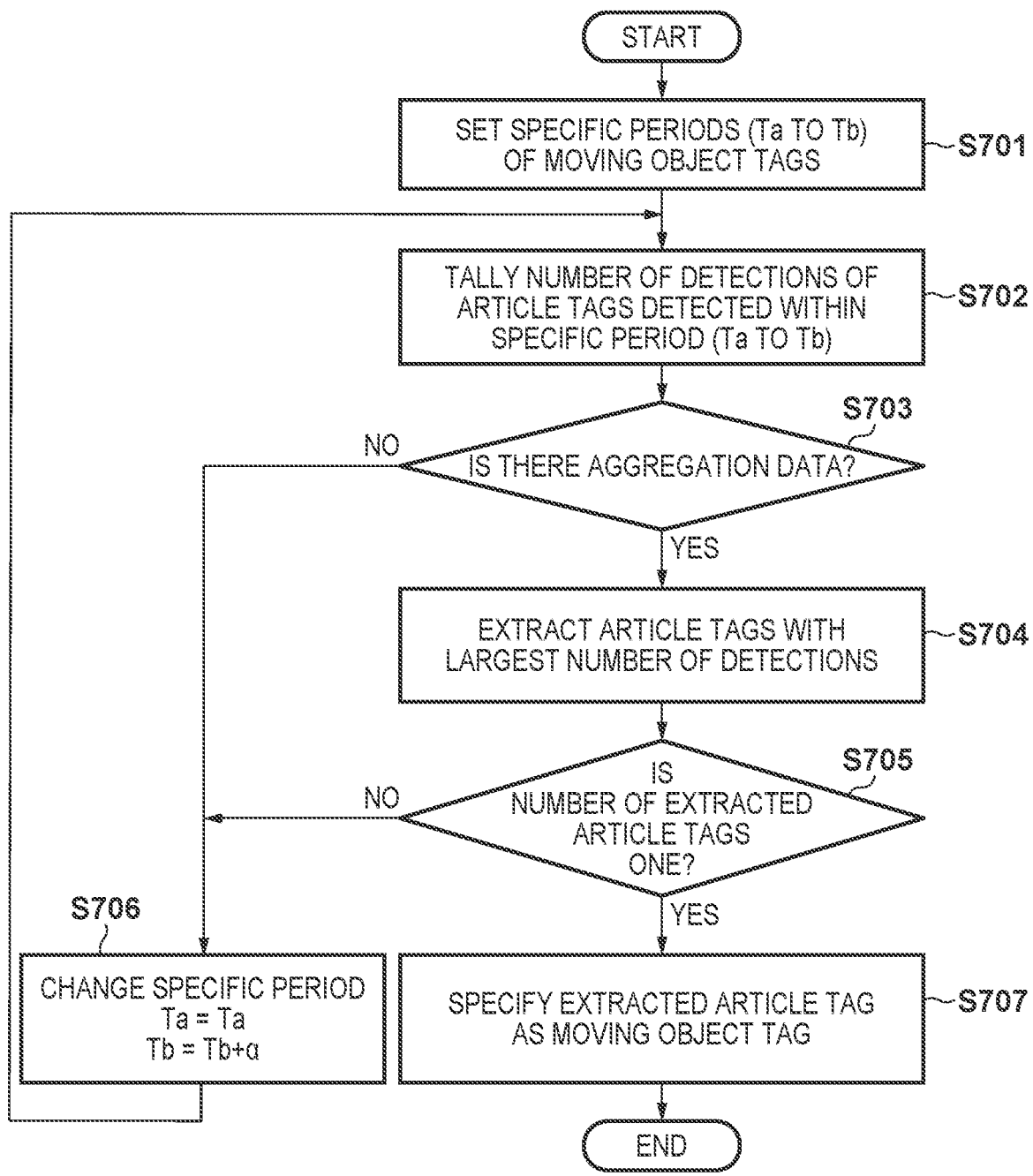
FIG. 9 is a flowchart illustrating a process of specifying a moving object tag by the information processing apparatus of the first embodiment.

Note that when there is a possibility that the user 119 (moving object) wearing the RFID reader 100 may change, the sequence of FIG. 9 may be repeatedly executed so that the ID information of the moving object tag is updated. In this case, the moving object tag specifying unit 323 repeats the process of FIG. 9 while automatically updating the specific period. As a method of updating the specific period, for example, the end time Tb of the current specific period is set to the start time Ta of the specific period after the update, and the time to which a period β of a predetermined length is added to this Ta is set as the end time Tb of the specific period after the update (Ta=Tb, Tb=Ta+β). Note that when there is no possibility that the user 119 (moving object) wearing the RFID reader 100 may change, the sequence of FIG. 9 may be executed just once, and the moving object tag may be finalized.

As described above, in the first embodiment, the number of detections, which is the detection state of the article tags during the specific period, is determined, and the moving object tag attached to the moving object (the user 119) is specified based on the determined detection states. Note that in the first embodiment described above, the detection state of RFID tags is not limited to the number of detections (number of detections of ID information). For example, the reception radio field intensity or communication distance of the RFID reader 100 can be used as the detection state. Hereinafter, a method of specifying a moving object tag in the case where the reception radio field intensity or communication distance is used as the detection state will be described. It should be noted that the RFID reader 100 generates association information including the reception radio field intensity or communication distance.

First, a method of using the reception radio field intensity of the RFID reader 100 as the detection state used for specifying moving object tag will be described. Since the user 119 (moving object) is wearing both the RFID reader 100 and the moving object tag 140*z*, the distance between the RFID reader 100 and the moving object tag 140z is short. Therefore, the RFID reader 100 can always detect radio waves received from the moving object tags 140z at a relatively strong radio field intensity. Therefore, the RFID tag having the strongest reception radio field intensity (e.g., average value) during the specific period can be specified as the moving object tag 140z.

Next, a method of utilizing an estimation value of communication distance between the RFID reader 100 and an RFID tag when the ID information is detected as a detection state used for specifying the moving object tag will be described. A method for measuring the distance between an RFID reader and an RFID tag has been proposed, for example, in Japanese Patent No. 5987187. Since the user 119 (moving object) is wearing both the RFID reader 100 and the moving object tag 140z, the distance between the RFID reader 100 and the moving object tag 140z always is short, and the communication distance between the RFID reader 100 and the moving object tag 140z is always short. That is, by calculating the distance between an RFID reader and an RFID tag, the tag whose communication distance (e.g., average value) is the shortest in the specific period can be specified as the moving object tag 140z.

As described above, in the first embodiment, simply by attaching a moving object tag to a moving object carrying the RFID reader 100, the identification information of that moving object can be automatically specified. Therefore, it is possible to realize article management in which the information of a moving object and an article are associated without being conscious of the identification information of the moving object carrying the RFID reader.

Further, as described above, the method of specifying a moving object tag according to the first embodiment can be applied when one RFID reader 100 is shared by a plurality of moving objects (e.g., a plurality of users). As the moving object carrying the RFID reader 100 changes, the RFID tag specified as the moving object tag automatically changes accordingly. When the RFID reader 100 is shared by a plurality of users, an operation in which the user who takes over the RFID reader 100 sets their ID information in the RFID reader 100 is required every time. For this reason, not only does it take time to hand over the RFID reader 100, but also mistakes such as forgetting to set the ID information or mistakes in setting the ID information are likely to occur. According to the method of specifying a moving object tag in the first embodiment, the ID information of a moving object tag is specified as the ID of a user carrying the RFID reader 100 simply by affixing the moving object tag to a property (ID card, uniform, etc.) of the user carrying the RFID reader 100, for example. Therefore, it is possible to prevent the trouble of registering ID information, the mistake of forgetting to perform setting, and the like.

Also, in the method of specifying a moving object tag in the first embodiment, RFID tags operating in the same communication method are used for both the article tags 140a to 140c and the moving object tags 140y to 140z. Therefore, it is possible to reduce the size of a communication circuit required for the RFID reader 100, thereby enabling to reduce cost of the apparatus and realize miniaturization. Note that, as illustrated in FIGS. 2A to 2C, the target to which the RFID reader 100 and a moving object tags are attached is not limited to the user. For example, it can be used for specifying a moving object other than a person, such as attaching to an AGV (Automatic Guided Vehicle 121) or the drone 120. Of course, the above embodiment can be applied without problems even when the RFID reader 100 is handed over between people and machines, such as from the user 119 to the drone 120.

Second Embodiment

In the first embodiment, the ID information of a moving object tag is specified from the ID information of RFID tags obtained based on the obtainment state (such as number of communications, reception radio field intensity, and communication distance) within a specific period of the ID information from the RFID tags by the RFID reader 100. Here, in the first embodiment, the specific period has been adjusted based on the number of extracted RFID tags, but in the second embodiment, the specific period is further adjusted based on the moving amount of the RFID reader 100. That is, the RFID reader 100 of the second embodiment transmits a result of detection by the moving amount detection sensor 104 to the information processing apparatus 200. The information processing apparatus 200 calculates the moving amount of the RFID reader 100 from the result of detection by the moving amount detection sensor 104, and adjusts the specific period of the moving object tag using the calculated moving amount. Note that the configuration of the system, the configuration and operation of the RFID reader 100, and the configuration of the information processing apparatus 200 are the same as those of the first embodiment (FIGS. 1 to 8).

Figure 10:
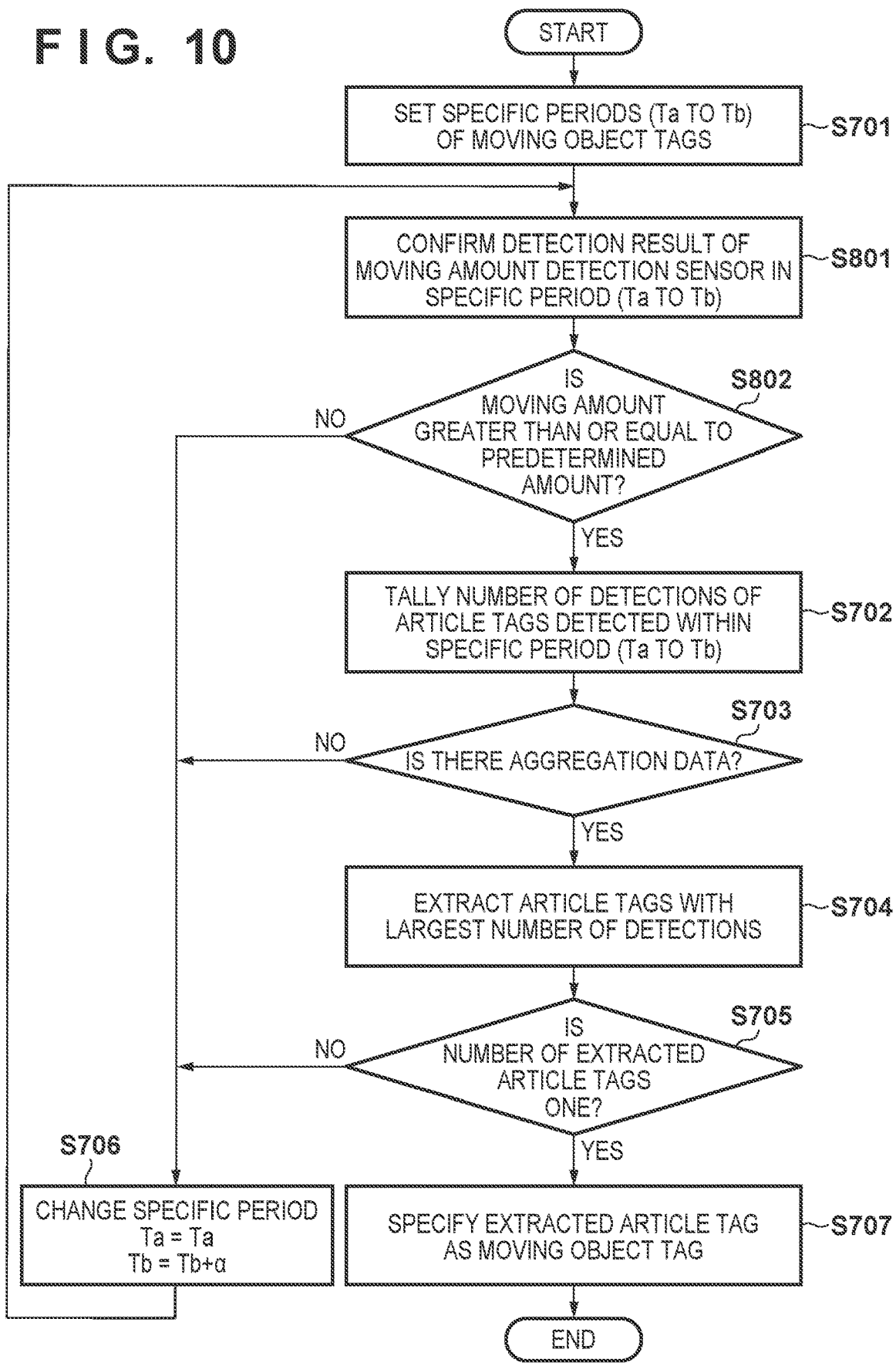
FIG. 10 is a flowchart illustrating a process of specifying a moving object tag by an information processing apparatus of a second embodiment.

FIG. 10 is a flowchart illustrating a process of the information processing apparatus 200 specifying a moving object tag according to a second embodiment. Step S701 to S707 are the same process as that of the first embodiment (FIG. 9). Hereinafter, the process in steps S801 to S802, which have been newly added in FIG. 10, will be mainly described.

In step S801, the moving object tag specifying unit 323 calculates an accumulated value of the moving amount of the RFID reader 100 in the specific period (time Ta to Tb) set in step S701 from the detection result of the moving amount detection sensor 104. In step S802, the moving object tag specifying unit 323 determines whether or not the moving amount calculated in step S801 is greater than or equal to a predetermined value. When the moving amount is greater than or equal to the predetermined amount (YES in step S802), the process proceeds to step S702, and when the moving amount is less than the predetermined amount (NO in step S802), the process proceeds to step S706. If the specific period is changed in step S706, the process is executed again from step S801.

As described above, in the method of specifying a moving object tag in the second embodiment, the moving object tag specifying unit 323 adjusts the specific period for specifying a moving object tag so that the moving amount obtained based on the detection result of the moving amount detection sensor 104 of the RFID reader 100 is greater than or equal to the predetermined amount. While the user 119 wearing both the RFID reader 100 and the moving object tag 140z is moving, there is more likely to be a difference in the detection states of the ID information between the moving object tag and an article tag, which does not travel with the user 119, and therefore it is easier to identify the moving object tag. According to the method of specifying a moving object in the second embodiment, it is possible to specify a moving object tag using a specific period in which a moving amount can be ensured, thereby enabling to specify the moving object tag more easily and accurately.

Note that when there is a possibility that the user 119 (moving object) wearing the RFID reader 100 may be changed as in the first embodiment, the sequence of FIG. 10 may be repeatedly executed and the information of the moving object tag may be repeatedly updated. Note that when there is no possibility that the user 119 (moving object) wearing the RFID reader 100 will change, the sequence of FIG. 10 may be executed just once, and the moving object tag may be finalized.

Also, as in the first embodiment, an average reception strength, average communication distance, or the like, for example, can be used as the detection state of the ID information by the RFID reader 100 during the specific period, in addition to using the number of detections.

As described above, in the second embodiment, a moving object tag is specified based on the ID information detected during the period in which the accumulated value of the moving amount of the RFID reader 100 is larger than the predetermined value. That is, it is possible to narrow down the RFID tags to be candidates for the moving object tag, and thereby it becomes easier to specify the moving object as compared with the first embodiment.

Third Embodiment

In the first and second embodiments, the association information database 12 was created without distinguishing between article tags and a moving object tag. In the third embodiment, a configuration in which a moving object tag attached to a moving object carrying the RFID reader 100 is extracted more reliably and easily by creating an association information database 12*a* in which moving object tags and article tags are distinguished will be described. That is, in the first and second embodiments, the tag of a moving object carrying the RFID reader 100 is specified from the plurality of article tags, but in the third embodiment, the tag of the moving object carrying the RFID reader 100 is specified from the plurality of moving object tags. Note that the configuration of the system, the configuration and operation of the RFID reader 100, and the configuration of the information processing apparatus 200 are the same as those of the first and second embodiments, and portions that are different from those of the first and second embodiments will be mainly described below.

Figure 11:
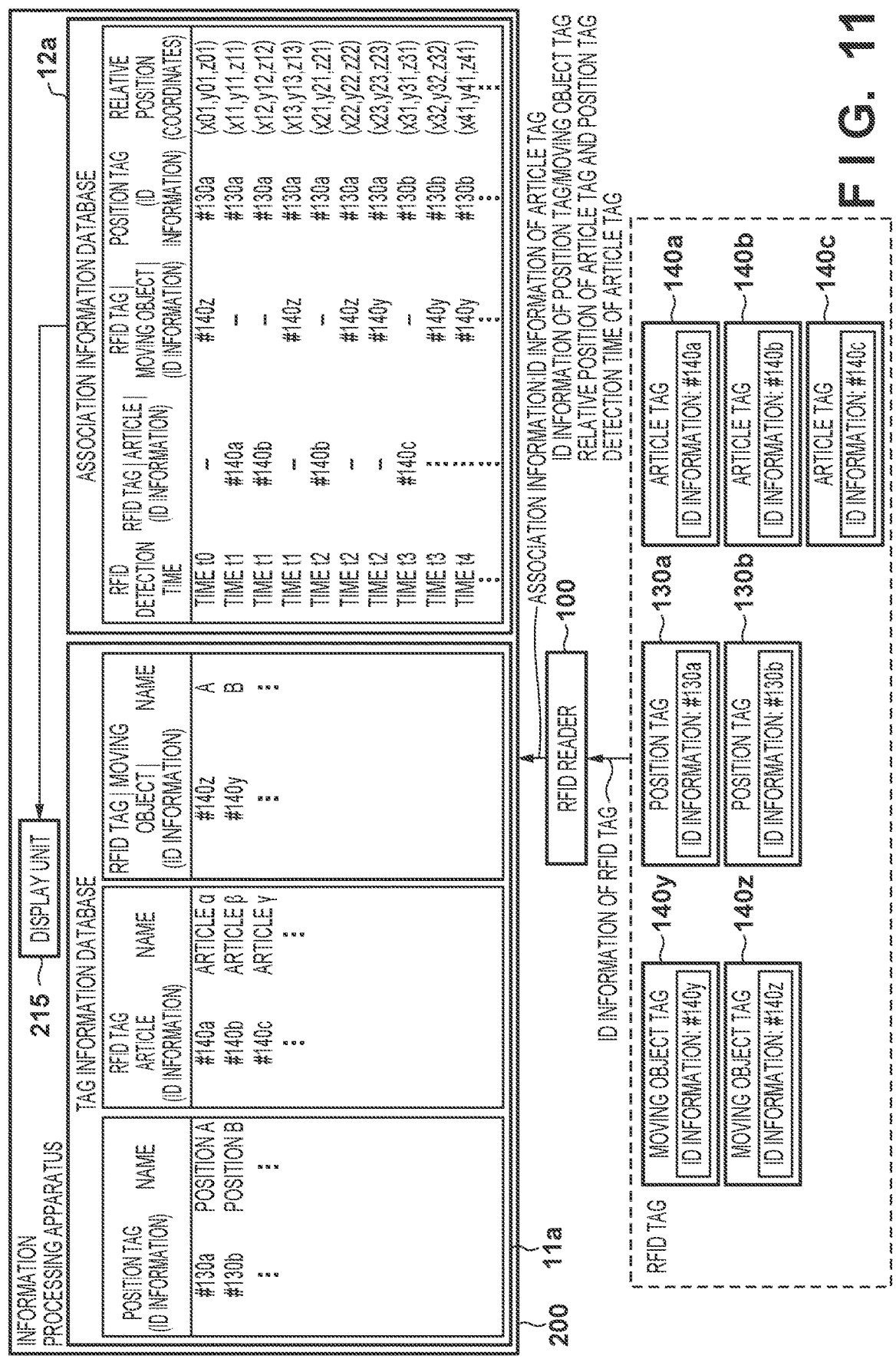
FIG. 11 is a view illustrating an example of a data configuration of association information and databases according to a third embodiment.

FIG. 11 is a view illustrating an example of a data configuration of association information and databases according to a third embodiment. As illustrated in FIG. 11, article tags and moving object tags are classified and registered in a tag information database 11*a*. By referring to the tag information database 11*a*, the DB generation unit 322 can distinguish article tags (140*a* to *c*) from moving object tags (140*y* to *z*). That is, by referring to the tag information database 11*a*, the DB generation unit 322 can classify the association information received from the RFID reader 100 into association information of article tags and association information of moving object tags. The DB generation unit 322 generates the association information database 12*a* in which RFID tags are distinguished into article tags and moving object tags.

The moving object tag specifying unit 323 only needs to specify a moving object tag of the moving object carrying the RFID reader 100 from moving object tags (140*y* to *z*) using the association information database 12*a*, and thereby the specification of the moving object tag becomes easier. The method of specifying a moving object tag according to the third embodiment will be described below, assuming a case where there are a plurality of articles around the RFID reader 100 and the moving object carrying the RFID reader 100 is changed in the middle. Note that in the third embodiment, the description of position tags is omitted similarly to the first and second embodiments.

Figure 12:
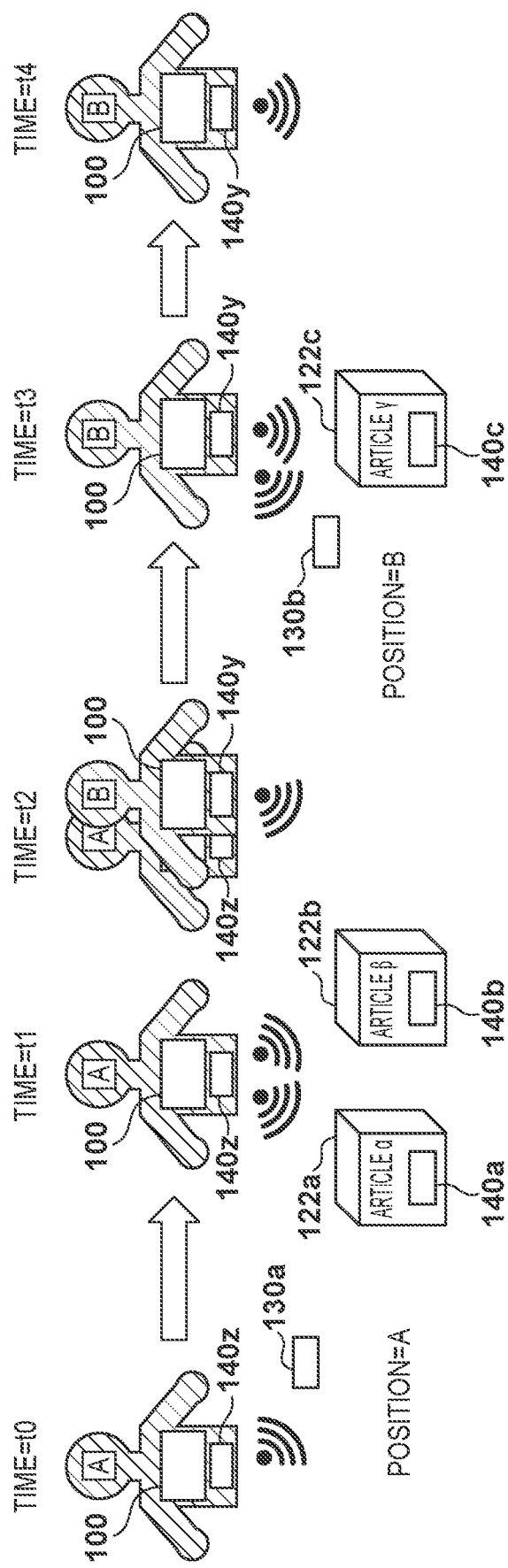
FIG. 12 is a view illustrating an example of operation of an RFID reader according to the third embodiment.

FIG. 12 is a view illustrating an example of operation (an example of the detection state of RFID tags) of the RFID reader 100 in the third embodiment. FIG. 12 illustrates a state in which the RFID reader 100 worn by the user A (moving object tag 140*z*) at time t0 is handed over to a user B (moving object tag 140*y*) at time t2, whereafter the user B wears the RFID reader 100. The RFID reader 100 reads the ID information of the position tag 130*a* and the ID information of the moving object tag 140*z* of the user A at time t0, and reads the ID information of the article tags 140*a* and 140*b* and the moving object tag 140*z* at time t1. At time t2, the RFID reader 100 is handed over from the user A to the user B having the moving object tag 140*y*, and the RFID reader 100 reads the ID information of the article tag 140*b* and the moving object tags 140*z* and 140*y*. At time t3, the RFID reader 100 reads the ID information of the position tag 130*b*, the article tag 140*c*, and the moving object tag 140*y*, and, at time t4, reads the ID information of the moving object tag 140*y*.

The example of registration of the association information database 12*a* of FIG. 11 illustrates an example of a configuration of data stored when the association information is received from the RFID reader 100 that performs the above read operation. As described above, the DB generation unit 322 generates the association information database 12*a* by distinguishing between article tags (140*a* to *c*) and moving object tags (140*y* to *z*).

The moving object tag specifying unit 323 performs the same process as that of the first embodiment (FIG. 9), but RFID tags, which are targets of aggregation of the detection status, are not article tags (including moving object tags), but are moving object tags. For example, the moving object tag specifying unit 323 specifies the moving object tag of the moving object carrying the RFID reader 100 in accordance with the number of detections of the moving object tag within a specific period, where the specific period is from times tn to tn+2. When the association information is registered as illustrated in the association information database 12*a*, it can be seen that the number of detections of the moving object tag 140*z* is the largest in the specific period from t0 to t2, and that the moving object tag 140*z* (user A) is carrying the RFID reader 100. It can be seen that the number of detections of the moving object tag 140*y* is the largest during the specific period from t2 to t4, and the moving object tag 140*y* (user B) is carrying the RFID reader 100. Further, it can be seen that the moving object to which the RFID reader 100 is attached is switched from a person A to a person B at a timing that is close to time t2.

Note that, as in the first embodiment, instead of the number of detections of the moving object tag, the moving object may be specified using the average reception strength or average communication distance as the detection state. Further, similarly to the second embodiment (FIG. 10), the moving object tag carrying the RFID reader 100 may be specified from the ID information of the moving object tag detected during the period in which the accumulated value of the moving amount of the RFID reader 100 is larger than the predetermined value.

As described above, according to the third embodiment, by registering the moving object tags separately from the article tags in advance, the RFID tags to be candidates for the moving object tags can be narrowed down, and thereby it becomes easier to specify a moving object as compared with the first embodiment and the second embodiment.

Fourth Embodiment

In the first to third embodiments, RFID tags are used for both the article tags and the moving object tags. In the fourth embodiment, a method of using tags that operate with a communication method that is different from the article tags and moving object tags will be described. For example, as illustrated in FIG. 14, the article tags 140 (RFID tags) are attached to the articles 122, and beacons 150 using Bluetooth communication are attached to the moving objects. The RFID reader 100 has a communication unit (not illustrated) capable of communicating with the beacons 150, which are used as tags for moving objects, and obtains information (e.g., ID information) capable of individual identification of the beacons 150.

FIG. 14 illustrates a state in which the RFID reader 100 worn by the user A (beacon 150z) at time t0 is handed over to a user B (beacon 150y) at time t2, whereafter the user B wears the RFID reader 100. FIG. 14 is similar to FIG. 12 except that the tags that the moving objects are wearing are changed from moving object tags 140 (RFID tags) to beacons 150.

Figure 13:
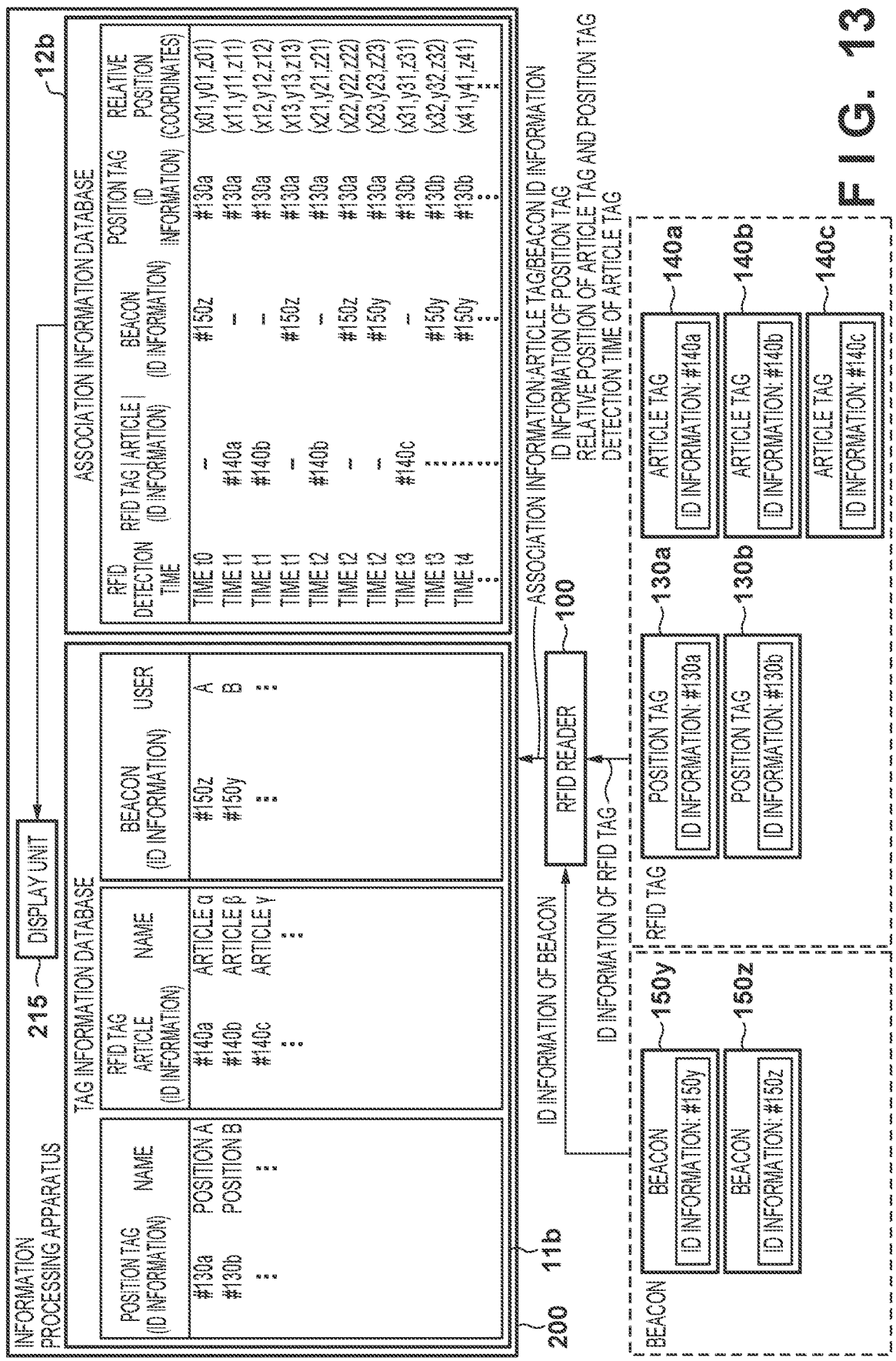
FIG. 13 is a view illustrating an example of a data configuration of association information and databases according to a fourth embodiment.

FIG. 13 is a view illustrating an example of a data configuration of association information and databases according to the fourth embodiment. In a tag information database 11b and an association information database 12b of the fourth embodiment, the ID information of the beacons of the moving objects is registered in place of the ID information of the moving object tags (RFID tags of the moving objects). In the process of the fourth embodiment, the moving object tags are replaced with beacons in the process of the third embodiment, and the moving object (beacon) carrying the RFID reader 100 can be specified as in the third embodiment.

In addition, as in the first embodiment, the RFID reader 100 can specify the ID information of the beacon 150 worn by the moving object based on the number of detections of the beacon 150, the average reception strength of the beacon 150, or the average communication distance of the beacon 150 during a determination period. Instead of using the beacons 150 that uses Bluetooth communication for the moving object tags, a smart phone having a Bluetooth communication function may be used. In this case, a smart phone used as the beacon 150 may also be used as the information processing apparatus 200.

As described above, according to the fourth embodiment, moving object tags can use a communication system that is different from that of article tags. In other words, moving object tags other than RFID tags can also be used, and thereby it becomes possible to widen the options in the system for when it is actually used.

As described above, according to each of the above embodiments, it is possible to automatically specify identification information of a moving object carrying a reader apparatus that reads wireless tags.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-157675, filed Sep. 18, 2020, which is hereby incorporated by reference herein in its entirety.

What is claimed is:

1. An information processing system comprising an information processing apparatus and a reader apparatus, and operable to specify identification information of a first communication object that moves with a moving object that carries the reader apparatus, the system comprising:
   a receiving unit configured to receive, from the reader apparatus, identification information that the reader apparatus respectively reads from a plurality of communication objects near the reader apparatus, and respective reading times thereof, the plurality of communication objects including the first communication object;
   a storing unit configured to store, in a memory unit, association information that includes association of the identification information received by the receiving unit and the respective reading times; and
   a specifying unit configured to specify the identification information of the first communication object that moves with the moving object that carries the reader apparatus based on the association information stored in the memory unit.

2. The system according to claim 1, wherein the specifying unit specifies the identification information of the first communication object that moves with the moving object that carries the reader apparatus based on association information whose reading time belongs within a specific period.

3. The system according to claim 1, wherein the specifying unit counts a number of detections of identification information of each communication object of the plurality of communication objects from the association information, and specifies the identification information of the first communication object that moves with the moving object that carries the reader apparatus based on the counted number of detections.

4. The system according to claim 3, wherein the specifying unit specifies identification information with a highest number of detections counted for association information whose reading time belongs in a specific period, as the identification information of the first communication object that moves with the moving object that carries the reader apparatus.

5. The system according to claim 1, wherein
the receiving unit receives a reception radio field intensity of identification information from the reader apparatus,
the association information includes association of identification information and a reception radio field intensity, and
the specifying unit specifies identification information as the identification information of the first communication object that moves with the moving object that carries the reader apparatus based on a reception radio field intensity of the association information.

6. The system according to claim 5, wherein the specifying unit specifies identification information, for which an average value of reception radio field intensity in association information whose reading time belongs in a specific period is the largest, as the identification information of the first communication object that moves with the moving object that carries the reader apparatus.

7. The system according to claim 1, wherein
the receiving unit receives a communication distance between the reader apparatus and a wireless tag at a time of detection of each piece of identification information,
the association information includes association of identification information and a communication distance, and
the specifying unit specifies identification information as the identification information of the first communication object that moves with the moving object that carries the reader apparatus based on a communication distance of the association information.

8. The system according to claim 7, wherein the specifying unit specifies identification information, for which an average value of a communication distance in association information whose reading time belongs in a specific period is the smallest, as the identification information of the first communication object that moves with the moving object that carries the reader apparatus.

9. The system according to claim 2, wherein
the receiving unit receives a detection result of a moving amount from the reader apparatus,
and further comprises a setting unit configured to set the specific period based on the detection result of a moving amount.

10. The system according to claim 9, wherein the setting unit sets the specific period such that an accumulated value of the detection result in the specific period is greater than or equal to a predetermined value.

11. The system according to claim 1, wherein
a registration of identification information of a communication object that is held by a moving object is included,
the specifying unit specifies the identification information of the first communication object that moves with the moving object that carries the reader apparatus based on association information related to identification information registered as identification information of a communication object that is held by a moving object.

12. The system according to claim 1, wherein the first communication object that moves with the moving object and a communication object that is attached to an article that is a target of management both communicate with the reader apparatus via an RFID.

13. The system according to claim 1, wherein
the first communication object that moves with the moving object communicates with the reader apparatus by a first communication method,
a communication object that is provided on an article that is a target of management communicates with the reader apparatus by a second communication method that is different from the first communication method, and
the specifying unit specifies the identification information of the first communication object that moves with the moving object that carries the reader apparatus based on association information related to identification information obtained by the first communication method.

14. The system according to claim 13, wherein the first communication method is Bluetooth, and the second communication method is an RFID.

15. An information processing apparatus operable to specify identification information of a first communication object that moves with a moving object that carries a reader apparatus, the apparatus comprising:
a receiving unit configured to receive, from the reader apparatus, identification information that the reader apparatus respectively reads from a plurality of communication objects near the reader apparatus, and respective reading times thereof, the plurality of communication objects including the first communication object;
a storing unit configured to store, in a memory unit, association information that includes association of the identification information received by the receiving unit and the respective reading times; and
a specifying unit configured to specify the identification information of the first communication object that moves with the moving object that carries the reader apparatus based on the association information stored in the memory unit.

16. The apparatus according to claim 15, wherein the specifying unit specifies the identification information of the first communication object that moves with the moving object that carries the reader apparatus based on association information whose reading time belongs within a specific period.

17. The apparatus according to claim 15, wherein the specifying unit counts a number of detections of identification information of each communication object of the plurality of communication objects from the association information, and specifies the identification information of the first communication object that moves with the moving object that carries the reader apparatus based on the counted number of detections.

18. The apparatus according to claim 15, wherein
the receiving unit receives a reception radio field intensity of identification information from the reader apparatus,
the association information includes association of identification information and a reception radio field intensity, and
the specifying unit specifies identification information as the identification information of the first communication object that moves with the moving object that carries the reader apparatus based on a reception radio field intensity of the association information.

19. The apparatus according to claim 15, wherein
the receiving unit receives a communication distance between the reader apparatus and a wireless tag at a time of detection of each piece of identification information,
the association information includes association of identification information and a communication distance, and
the specifying unit specifies identification information as the identification information of the first communication object that moves with the moving object that carries the reader apparatus based on a communication distance of the association information.

20. The apparatus according to claim 15, wherein
a registration of identification information of a communication object that is held by a moving object is included,
the specifying unit specifies the identification information of the first communication object that moves with the moving object that carries the reader apparatus based on association information related to identification information registered as identification information of a communication object that is held by a moving object.

21. An information processing method for specifying identification information of a first communication object that moves with a moving object that carries a reader apparatus, the method comprising:
receiving, from the reader apparatus, identification information that the reader apparatus respectively reads from a plurality of communication objects near the reader apparatus, and respective reading times thereof, the plurality of communication objects including the first communication object;
storing, in a memory unit, association information that includes association of the received identification information and the respective reading times; and
specifying the identification information of the first communication object that moves with the moving object that carries the reader apparatus based on the association information stored in the memory unit.

22. A non-transitory computer-readable storage medium operable to store a program for causing a computer to execute an information processing method for specifying identification information of a first communication object that moves with a moving object that carries a reader apparatus, the method comprising:
receiving, from the reader apparatus, identification information that the reader apparatus respectively reads from a plurality of communication objects near the reader apparatus, and respective reading times thereof, the plurality of communication objects including the first communication object;
storing, in a memory unit, association information that includes association of the received identification information and the respective reading times; and
specifying the identification information of the first communication object that moves with the moving object that carries the reader apparatus based on the association information stored in the memory unit.

* * * * *